United States Patent
Cao et al.

(10) Patent No.: US 11,522,461 B2
(45) Date of Patent: Dec. 6, 2022

(54) PHASE SEQUENCE CORRECTION METHOD AND CIRCUIT FOR VOLTAGE CONVERTER

(71) Applicant: Chengdu Monolithic Power Systems Co., Ltd., Chengdu (CN)

(72) Inventors: Yang Cao, Hangzhou (CN); Lijie Jiang, Hangzhou (CN)

(73) Assignee: Chengdu Monolithic Power Systems Co., Ltd., Chengdu (CN)

( * ) Notice: Subject to any disclaimer, the term of this patent is extended or adjusted under 35 U.S.C. 154(b) by 72 days.

(21) Appl. No.: 17/351,029

(22) Filed: Jun. 17, 2021

(65) Prior Publication Data

US 2022/0021307 A1    Jan. 20, 2022

(30) Foreign Application Priority Data

Jul. 15, 2020  (CN) .......................... 202010683461.9

(51) Int. Cl.
*H02M 3/158* (2006.01)
*H02M 3/157* (2006.01)
*H02M 1/00* (2006.01)

(52) U.S. Cl.
CPC ......... *H02M 3/1586* (2021.05); *H02M 3/157* (2013.01); *H02M 3/1584* (2013.01); *H02M 1/0009* (2021.05)

(58) Field of Classification Search
CPC ... H02M 3/1584; H02M 3/1586; H02M 1/088
See application file for complete search history.

(56) References Cited

U.S. PATENT DOCUMENTS

| | | | |
|---|---|---|---|
| 9,941,781 B2 | 4/2018 | Wangmiao | |
| 2002/0125869 A1* | 9/2002 | Groom | H02M 3/1584 323/283 |
| 2011/0169471 A1* | 7/2011 | Nagasawa | H01L 24/84 323/283 |

OTHER PUBLICATIONS

U.S. Appl. No. 16/849,152, filed Apr. 15, 2020, Daocheng.
U.S. Appl. No. 16/849,145, filed Apr. 15, 2020, Daocheng.

* cited by examiner

*Primary Examiner* — Alex Torres-Rivera
(74) *Attorney, Agent, or Firm* — Perkins Coie LLP

(57) ABSTRACT

A phase sequence correction circuit for a voltage converter has a blanking time calculation circuit and a control signal generation circuit. Based on a plurality of delay signals, the blanking time calculation circuit updates a blanking time period during which a immediately following switching circuit is not allowed on. If a sum of the plurality of delay signals is larger than an incremental threshold, then the blanking time signal increases by an incremental step. The control signal generation circuit receives the blanking time signal and provides a plurality of control signals to control a plurality of switching circuits of the voltage converter respectively. If a sum of the plurality of delay signals is larger than an incremental threshold, then the blanking time signal increases by an incremental step.

20 Claims, 7 Drawing Sheets

PHASE SEQUENCE CORRECTION METHOD AND CIRCUIT FOR VOLTAGE CONVERTER

CROSS-REFERENCE TO RELATED APPLICATIONS

This application claims the benefit of CN application 202010683461.9, filed on Jul. 15, 2020, and incorporated herein by reference.

TECHNICAL FIELD

The present invention generally relates to electronic circuits, and more particularly but not exclusively, to a voltage converter.

BACKGROUND

For multi-phase voltage converters with traditional uncoupled inductors, requirements of smaller current ripple and faster transient response are often contradictory. Multi-phase voltage converters with coupled inductors can meet these two requirements at the same time, so they are more and more used in places with strict power supply requirements, such as in CPU (Central Processing Unit), GPU (graphics processing unit), and server.

When employing a coupled inductor, it is usually necessary to control the phases of its windings to be interleaved with each other. For example, for a two-phase coupled inductor, the two windings should be interleaved with each other 180 degrees; for a four-phase coupled inductor, the four windings should be interleaved with each other 90 degrees. However, in current limiting mode of CPU, GPU, server or other similar application, when a current flowing through one of the windings exceeds an overcurrent threshold, generation of a corresponding control signal is affected. Due to the electromagnetic coupling between the windings of the coupled inductor, it will in turn affect a current flowing through other windings, and again affect generation of corresponding control signals of the multi-phase voltage converter, resulting in the phase sequence between the windings disordered. As a result, the multi-phase voltage converter cannot operate normally.

SUMMARY

Embodiments of the present invention are directed to a phase sequence correction method for a voltage converter. The voltage converter has a plurality of switching circuits, and each of the plurality of switching circuits has a phase current flowing through. The phase sequence correction method comprises: obtaining a plurality of delay signals; providing a total delay signal by adding the plurality of delay signals together; comparing the total delay signal with an incremental threshold, if the total delay signal is larger than the incremental threshold, then increasing the blanking time period by an incremental step; and providing a plurality of control signals to control the plurality of switching circuits respectively based on the blanking time period. Each of the plurality of delay signals representing a delay time period from expiring of a blanking time period of a corresponding switching circuit to turning on of a immediately following switching circuit of the corresponding switching circuit Embodiments of the present invention are also directed to a phase sequence correction circuit for a voltage converter. The voltage converter has a plurality of switching circuits, and each of the plurality of switching circuits has a phase current flowing through. The phase sequence correction circuit comprises a blanking time calculation circuit and a control signal generation circuit. The blanking time calculation circuit is configured to receive a blanking time signal and a plurality of delay signals, and the blanking time calculation circuit is configured to update the blanking time signal based on the plurality of delay signals. The control signal generation circuit is configured to receive the blanking time signal and provide a plurality of control signals to control the plurality of switching circuits respectively. If a sum of the plurality of delay signals is larger than an incremental threshold, then the blanking time calculation circuit is configured to increase the blanking time signal by an incremental step. The blanking time signal represents a blanking time period during which a immediately following switching circuit is not allowed on.

Embodiments of the present invention are further directed to a voltage converter having an input terminal and an output terminal. The voltage converter comprises a plurality of switching circuits, a magnetic element, a blanking time calculation circuit, and a control signal generation circuit. Each of the plurality of switching circuits has a phase current flowing through. The magnetic element has a plurality of windings magnetic coupled with each other. Each of the plurality of windings has a first terminal coupled to the input terminal through a corresponding one of the plurality of switching circuits, and a second terminal coupled to the output terminal. The blanking time calculation circuit is configured to receive a blanking time signal representative of a blanking time period during which a immediately following switching circuit is not allowed on, and a plurality of delay signals, and the blanking time calculation circuit is configured to update the blanking time signal based on the plurality of delay signals. The control signal generation circuit is configured to receive the blanking time signal and provide a plurality of control signals to control the plurality of switching circuits respectively. If a sum of the plurality of delay signals is larger than an incremental threshold, then the blanking time calculation circuit is configured to increase the blanking time signal by an incremental step.

These and other features of the present invention will be readily apparent to persons of ordinary skill in the art upon reading the entirety of this disclosure, which includes the accompanying drawings and claims.

BRIEF DESCRIPTION OF THE DRAWING

The present invention can be further understood with reference to the following detailed description and the appended drawings, wherein like elements are provided with like reference numerals.

DETAILED DESCRIPTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

Reference to "one embodiment", "an embodiment", "an example" or "examples" means: certain features, structures, or characteristics are contained in at least one embodiment of the present invention. These "one embodiment", "an embodiment", "an example" and "examples" are not necessarily directed to the same embodiment or example. Furthermore, the features, structures, or characteristics may be combined in one or more embodiments or examples. In addition, it should be noted that the drawings are provided for illustration, and are not necessarily to scale. And when an element is described as "connected" or "coupled" to another element, it can be directly connected or coupled to the other element, or there could exist one or more intermediate elements. In contrast, when an element is referred to as "directly connected" or "directly coupled" to another element, there is no intermediate element. When a signal is described as "equal to" another signal, it is substantially identical to the other signal.

Figure 1:
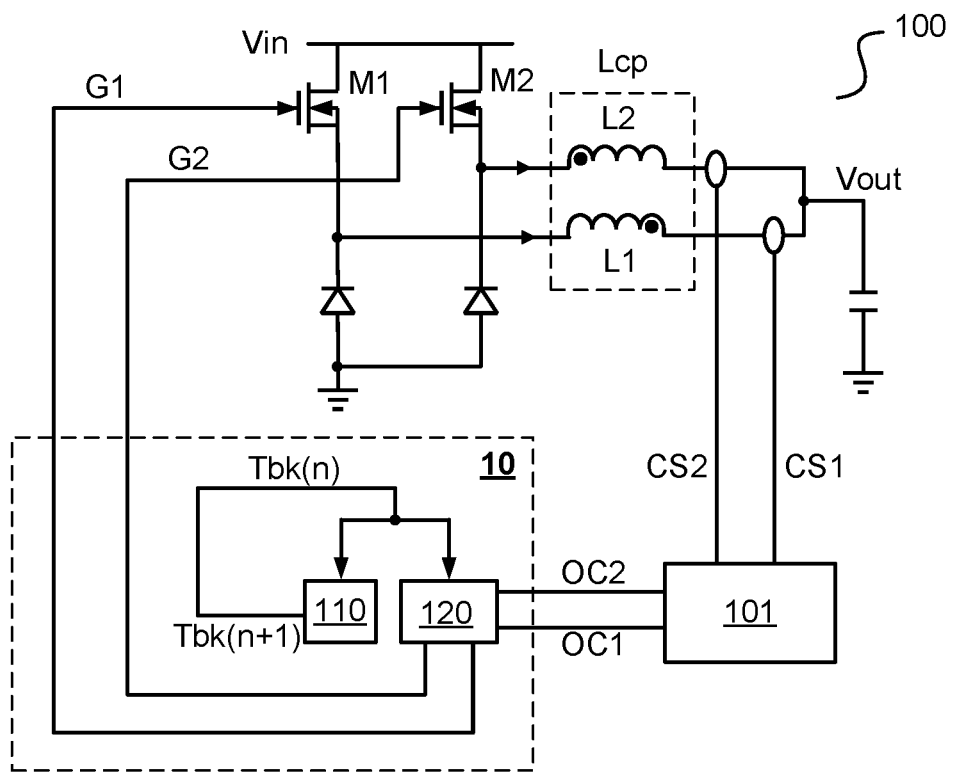
FIG. 1 is a schematic block diagram of a voltage converter 100 for a voltage converter using a coupled inductor in accordance with an embodiment of the present invention.

FIG. 1 is a schematic block diagram of a voltage converter 100 with a coupled inductor in accordance with an embodiment of the present invention. For ease of description and explanation, the voltage converter 100 shown in the FIG. 1 has two-phase switching circuits, one comprising a switch M1, and the other comprising a switch M2. The switch M1 has a first terminal, a second terminal, and a control terminal. The switch M2 has a first terminal, a second terminal, and a control terminal. The first terminal of the switch M1 and the first terminal of the switch M2 are coupled to an input terminal of the voltage converter 100 to receive an input voltage Vin. A magnetic element comprising a two-phase coupled inductor Lcp having windings L1 and L2 magnetic coupled with each other is employed. The winding L1 has a first terminal coupled to the second terminal of the switch M1 and a second terminal, and the winding L2 has a first terminal coupled to the second terminal of the switch M2 and a second terminal. The second terminal of the winding L1 and the second terminal of the winding L2 are coupled to an output terminal of the voltage converter 100 to provide an output voltage Vout. For ease of description, it is assumed that the current switching period is an $n^{th}$ switching period after the voltage converter 100 is started. Where n is a natural number larger than one. The voltage converter 100 has a phase sequence correction circuit 10 as shown in FIG. 1. The phase sequence correction circuit 10 has a blanking time calculation circuit 110 and a control signal generation circuit 120. The blanking time calculation circuit 110 receives a blanking time signal Tbk(n) of the current switching period, and provides a blanking time signal Tbk(n+1) of the next switching period. The control signal generation circuit 120 receives the blanking time signal Tbk(n), and over current indicating signals OC1 and OC2, and provides a control signal G1 to control the switch M1 based on the over current indicating signal OC1 and the blanking time signal Tbk(n), and a control signal G2 to control the switch M2 based on the over current indicating signal OC2 and the blanking time signal Tbk(n). The blanking time signal Tbk(n) contains a time information, e.g., a blanking time period Tbk(n) during which a immediately following switching circuit is not allowed on, i.e., the immediately following switching circuit maintains off. In one embodiment, the blanking time signal Tbk(n) is a digital signal with a constant value. In another embodiment, the blanking time signal Tbk(n) is a voltage signal with a constant voltage level.

Figure 2:
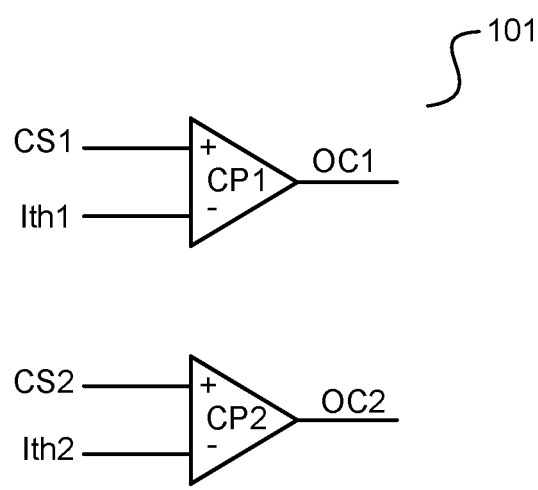
FIG. 2 is a schematic block diagram of an over current indicating circuit 101 inductor in accordance with an embodiment of the present invention.

FIG. 2 is a schematic block diagram of an over current indicating circuit 101 in accordance with an embodiment of the present invention. The over current indicating circuit 101 provides the over current indicating signals OC1 and OC2 based on current sense signals CS1 and CS2. The current sense signal CS1 represents a phase current flowing through the winding L1 and the switch M1, and the current sense signal CS2 represents a phase current flowing through the winding L2 and the switch M2. The over current indicating circuit 101 comprises comparators CP1 and CP2. The comparator CP1 receives the current sense signal CS1 and an overcurrent threshold Ith1, and provides the over current indicating signal OC1 based on the current sense signal CS1 and the overcurrent threshold Ith1. When the current sense signal CS1 is larger than the overcurrent threshold Ith1, the over current indicating signal OC1 becomes at a first status, e.g., at a high voltage level, to indicate that the phase current flowing through the winding L1 is at an over-current state. The comparator CP2 receives the current sense signal CS2 and an overcurrent threshold Ith2, and provides the over current indicating signal OC2 based on the current sense signal CS2 and the overcurrent threshold Ith2. When the current sense signal CS2 is larger than the overcurrent threshold Ith2, the over current indicating signal OC2 becomes at the first status, e.g., at the high voltage level, to indicate that the phase current flowing through the winding L2 is at the over-current state. In another embodiment, the over current indicating signal OC1 becomes at a low voltage level to indicate that the phase current flowing through the winding L1 is at the over-current state, and the over current indicating signal OC2 becomes at the low voltage level to indicate that the phase current flowing through the winding L2 is at the over-current state. Those of ordinary skill in the art should know that the over current indicating signals OC1 and OC2 are not limited to being high voltage level, low voltage level or pulse edge to indicate whether the phase current flowing through the windings L1 and L2 are at the over-current state.

Figure 3A:
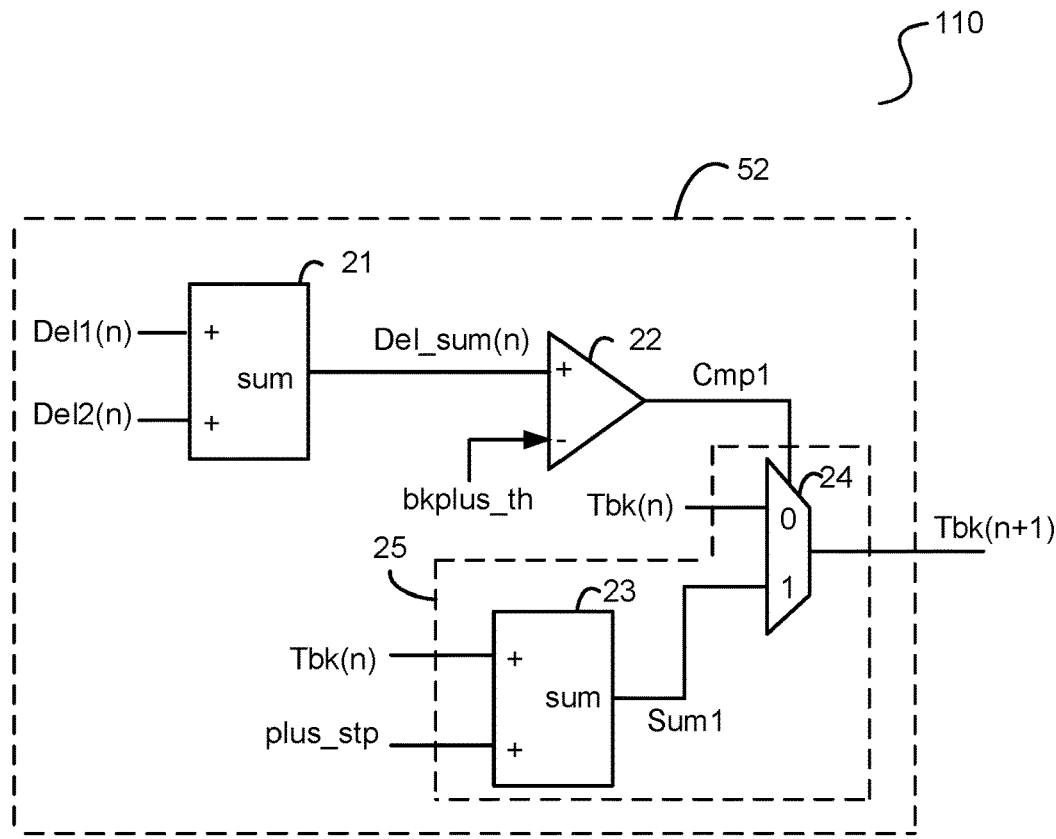
FIG. 3A is a schematic block diagram of a blanking time calculation circuit 110 in accordance with an embodiment of the present invention.
Figure 3B:
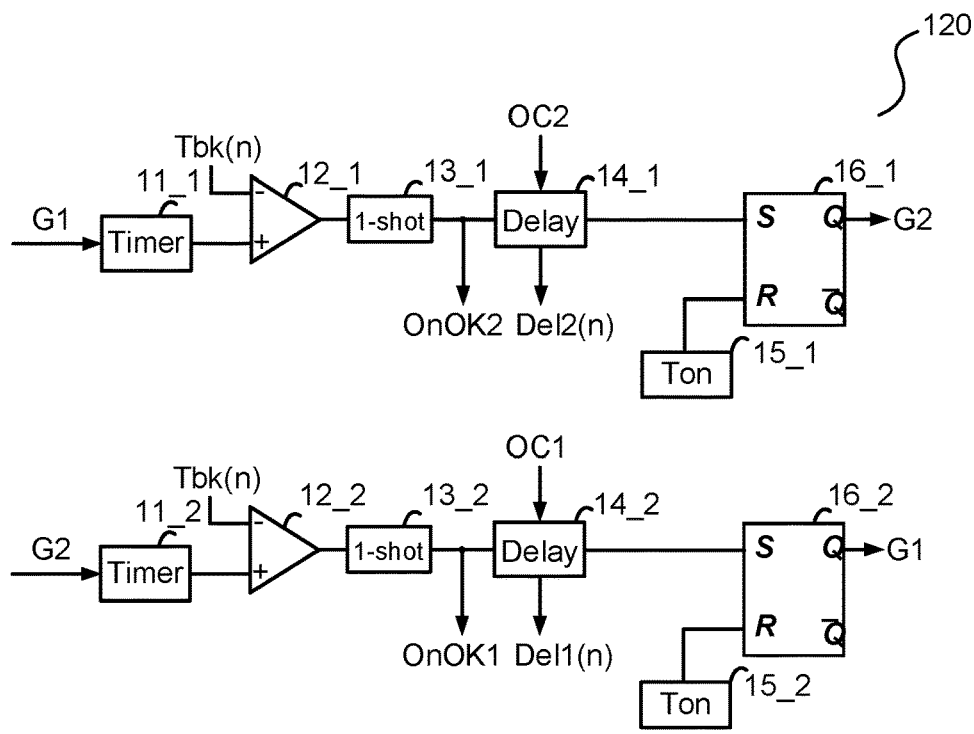
FIG. 3B is a schematic block diagram of a control signal generation circuit 120 in accordance with an embodiment of the present invention.
Figure 4:
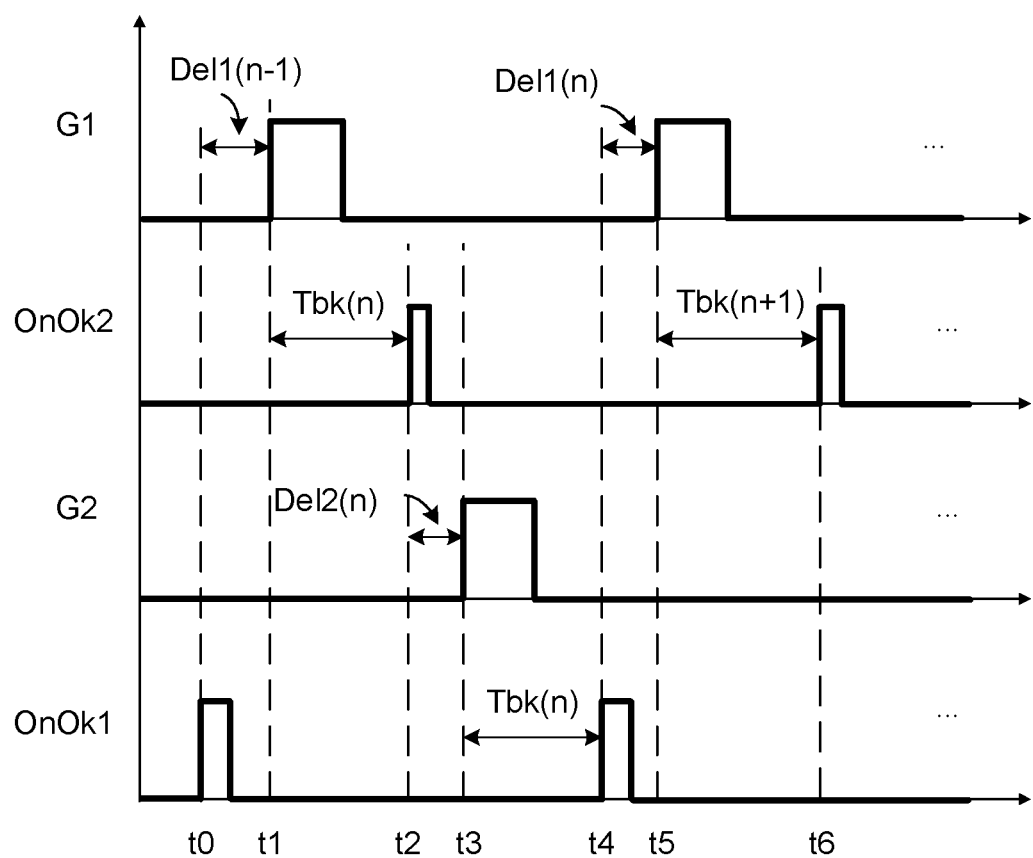
FIG. 4 show operation waveforms of the blanking time calculation 110 shown in FIG. 3A and the control signal generation circuit 120 shown in FIG. 3B in accordance with embodiments of the present invention.

FIG. 3A is a schematic block diagram of the blanking time calculation circuit 110 in accordance with an embodiment of the present invention. FIG. 3B is a schematic block diagram of the control signal generation circuit 120 in accordance with an embodiment of the present invention. FIG. 4 show operation waveforms of the blanking time calculation 110 shown in FIG. 3A and the control signal generation circuit 120 shown in FIG. 3B in accordance with embodiments of the present invention. Working process of the phase sequence correction circuit 10 is described below referring to FIGS. 3A, 3B and 4.

As shown in FIG. 4, time t0-t1 is deemed as part of a previous switching period, i.e. an $(n-1)^{th}$ switching period. At time t0, a blanking release signal OnOk1 generates a pulse to indicate that the blanking time period is expired, and the control signal G1 is allowed to generate a pulse to turn on the switch M1. However, the over current indicating signal OC1 indicates that the phase current flowing through the winding L1 is still larger than the overcurrent threshold Ith1 at time t0, thus the control signal G1 keeps at the low voltage level. Until time t1, the over current indicating signal OC1 indicates that the phase current flowing through the winding L1 reduces to less than the overcurrent threshold Ith1, the control signal G1 generates a pulse to turn on the switch M1, and the current switching period starts. i.e., the $n^{th}$ switching period starts.

At time t1, after the control signal G1 generates the pulse, a timer 11_1 shown in FIG. 3B starts timing. A comparator 12_1 shown in FIG. 3B compares a timing period timed by the timer 11_1 with the blanking time period Tbk(n), and provides a comparison result to a one-shot circuit 13_1 shown in FIG. 3B. At time t2, the timing period timed by the timer 11_1 equals the blanking time period Tbk(n), the one-shot circuit 13_1 provides a blanking release signal OnOk2 with a pulse, and a delay circuit 14_1 shown in FIG. 3B starts timing. The delay circuit 14_1 further receives the over current indicating signal OC2. At time t3, the over current indicating signal OC2 indicates that the phase current flowing through the winding L2 reduces to less than the overcurrent threshold Ith2, thus the delay circuit 14_1 stops timing and provides a delay signal Del2(n) to record a time period between time t2 and time t3, that is a delay time period from expiring of the blanking time period to turning on of the immediately following switching circuit. At time t3, the control signal G2 generates a pulse to turn on the switch M2. In one embodiment shown in FIG. 3B, an output terminal of the delay circuit 14_1 is coupled to a set terminal S of a RS flip-flop 16_1, a constant on-time control circuit 15_1 is coupled to a reset terminal R of the RS flip-flop 16_1 to control an on-time period of the switch M2 constant, and an output terminal Q of the RS flip-flop 16_1 provides the control signal G2.

Similarly, at time t3, after the control signal G2 generates the pulse, a timer 11_2 shown in FIG. 3B starts timing. At time t2, the timing period timed by the timer 11_2 equals the blanking time period Tbk(n), the one-shot circuit 13_2 provides a blanking release signal OnOk1 with a pulse, and a delay circuit 14_2 shown in FIG. 3B starts timing. At time t5, the over current indicating signal OC1 indicates that the phase current flowing through the winding L1 reduces to less than the overcurrent threshold Ith1, thus the delay circuit 14_2 stops timing and provides a delay signal Del1(n) to record a time period between time t4 and time t5, that is a delay time period from expiring of the blanking time period to turning on of the immediately following switching circuit. At time t5, the control signal G1 generates a pulse to turn on the switch M1. Then a next switching period starts. In one embodiment shown in FIG. 3B, an output terminal of the delay circuit 14_2 is coupled to a set terminal S of a RS flip-flop 16_2, a constant on-time control circuit 15_2 is coupled to a reset terminal R of the RS flip-flop 16_2 to control an on-time period of the switch M1 constant, and an output terminal Q of the RS flip-flop 16_2 provides the control signal G1.

According to the description above, the time between t1 and t5 is the current switching period. During the current switching period, the blanking time calculation circuit 110 updates the blanking time signal Tbk(n+1) based on the delay signal Del1(n) and the delay signal Del2(n). Thus, the control signals G1 and G2 for the next switching period are generated based on the blanking time signal Tbk(n+1). In the embodiment shown in FIG. 3A, the blanking time calculation circuit 110 comprises an increment calculation circuit 52.

As shown in FIG. 3A, the increment calculation circuit 52 comprises an adder 21, a comparator 22, and a selection circuit 25. The selection circuit 25 comprises an adder 23 and a multiplexer 24. The adder 21 receives the delay signals Del1(n) and Del2(n), and provides a total delay signal Del_sum(n) by adding the delay signals Del1(n) and Del2(n) together. The comparator 22 compares the total delay signal Del_sum(n) with an incremental threshold bkplus_th, and provides a comparison signal Cmp1. The adder 23 receives the blanking time signal Tbk(n), and an incremental step plus_stp, and provides a summation signal Sum1 by adding the blanking time signal Tbk(n) and the incremental step plus_stp. The multiplexer 24 has a first input terminal (labeled "0") configured to receive the blanking time signal Tbk(n), a second input terminal (labeled "1") configured to receive the summation signal Sum1, a control terminal configured to receive the comparison signal Cmp1, and an output terminal configured to provide the blanking time signal Tbk(n+1). The multiplexer 24 selects one of the blanking time signal Tbk(n) and the summation signal Sum1 as the blanking time signal Tbk(n+1) based on the comparison signal Cmp1. In other words, when the total delay signal Del_sum(n) is larger than the incremental threshold bkplus_th, the blanking time signal Tbk(n+1) equals the sum of the blanking time signal Tbk(n) and the incremental step plus_stp; otherwise, the blanking time signal Tbk(n+1) equals the blanking time signal Tbk(n).

In the present invention, the blanking time period Tbk(n) between the control signals G1 and G2 is sufficiently long, to ensure that the control signals G1 and G2 are out of 180 degrees, thus the phase sequence correct is achieved. In addition, the blanking time signal Tbk(n) can be adjusted adaptively to gradually reach an optimized value, thereby effectively reducing glitch of the output voltage Vout.

Figure 5A:
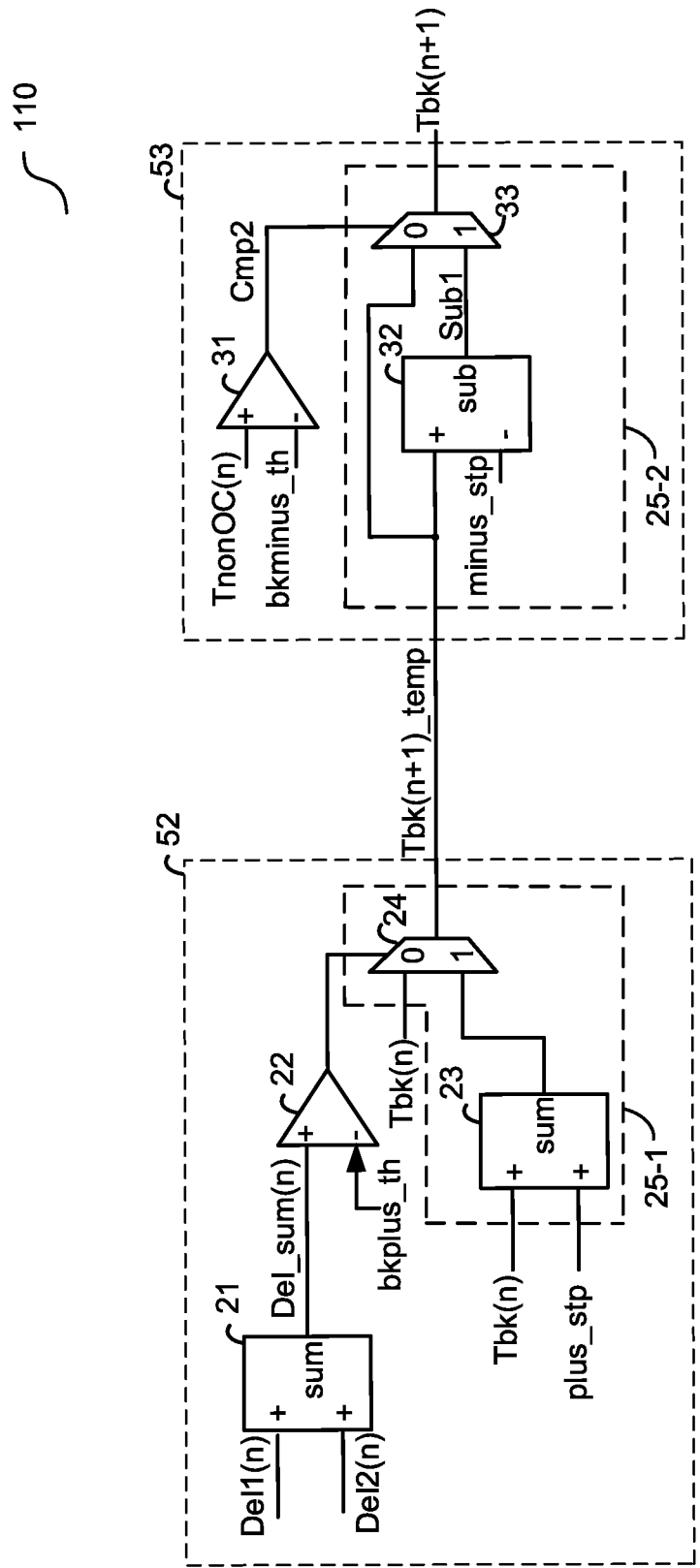
FIG. 5A is a schematic block diagram of the blanking time calculation circuit 110 in accordance with another embodiment of the present invention.
Figure 5B:
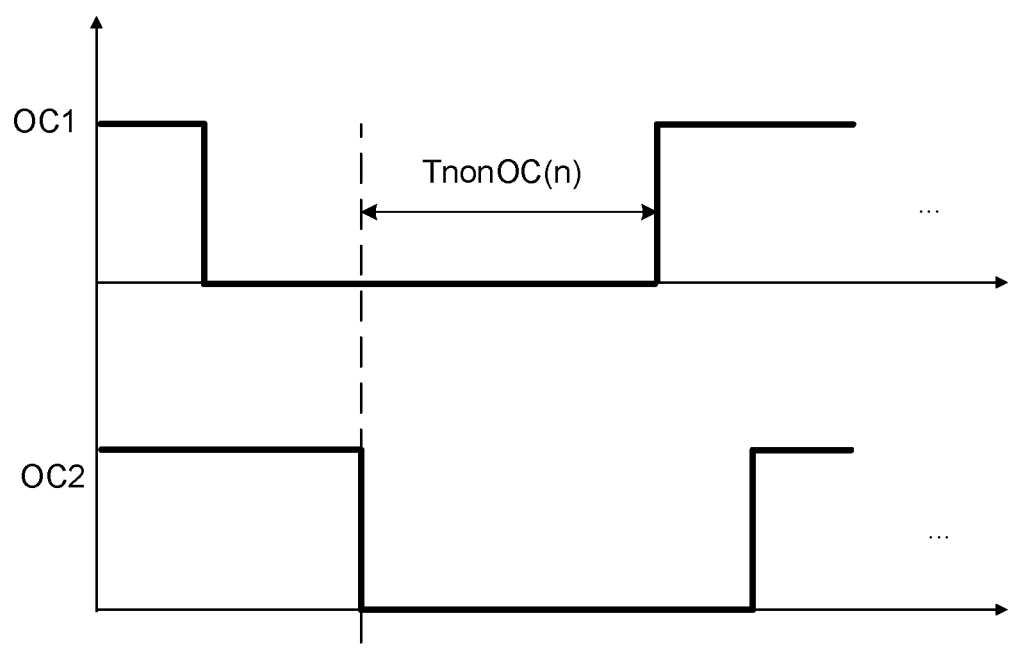
FIG. 5B show a partial waveform of the over current indication signals OC1 and OC2 shown in FIG. 5A in accordance with an embodiment of the present invention.

FIG. 5A is a schematic block diagram of the blanking time calculation circuit 110 in accordance with another embodiment of the present invention. FIG. 5B show a partial waveform of the over current indicating signals OC1 and OC2 shown in FIG. 5A in accordance with an embodiment of the present invention. In the embodiment of FIG. 5A, the blanking time calculation circuit 110 comprises the increment calculation circuit 52 and a decrement calculation circuit 53. The increment calculation circuit 52 provides an intermediate signal Tbk(n+1)_temp to the decrement calculation circuit 53. The decrement calculation circuit 53 provides the blanking time signal Tbk(n+1) based on the intermediate signal Tbk(n+1)_temp. The decrement calculation circuit 53 comprises a comparator 31, a subtractor 32, and a multiplexer 33. In one embodiment, the selection circuit 25 further comprises the subtractor 32 and the multiplexer 33. The comparator 31 receives a window signal TnonOC(n) and a decrement threshold bkminus_th, and provides a comparison signal Cmp2 based on comparing the window signal TnonOC(n) with the decrement threshold bkminus_th. The subtractor 32 receives the intermediate signal Tbk(n+1)_temp and a decrement step minus_stp, and provides a subtraction signal Sub1 via subtracting the decrement step minus_stp from the intermediate signal Tbk(n+1)_temp. The multiplexer 33 has a first input terminal (labeled "0") configured to receive the intermediate signal Tbk(n+1)_temp, a second input terminal (labeled "1") configured to receive the subtraction signal Sub1, a control terminal configured to receive the comparison signal Cmp2, and an output terminal configured to provide the blanking time signal Tbk(n+1). The multiplexer 33 selects one of the intermediate signal Tbk(n+1)_temp and the subtraction signal Sub1 as the blanking time signal Tbk(n+1) based on the comparison signal Cmp2. In other words, when the window signal TnonOC(n) is larger than the decrement threshold bkminus_th, The blanking time signal Tbk(n+1) equals the intermediate signal Tbk(n+1)_temp minus the decrement step minus_stp; otherwise, the blanking time signal Tbk(n+1) equals the intermediate signal Tbk(n+1)_temp. Referring to FIG. 5B, the window signal TnonOC(n) is a duration during which each of the phase currents is less than a corresponding overcurrent threshold, e.g., the phase current flowing through the winding L1 is less than the overcurrent threshold Ith1 and the phase current flowing through the winding L2 is less than the overcurrent threshold Ith2, and the over current indicating signal OC1 and the over current indicating signal OC2 are at the low voltage level as shown in FIG. 5B.

Figure 6:
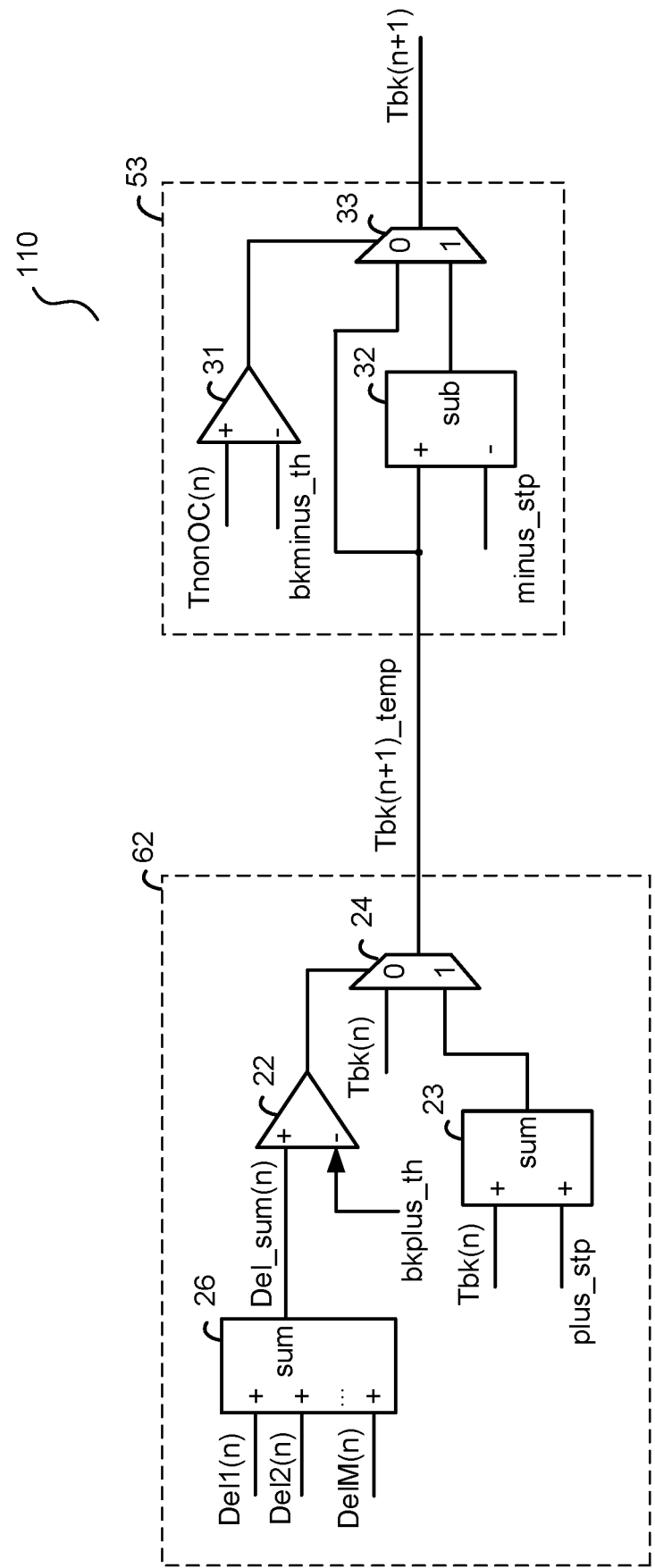
FIG. 6 shows a schematic block diagram of the blanking time calculation circuit 110 for a voltage converter using an M-phase coupled inductor in accordance with an embodiment of the present invention.

The application of two-phase coupled inductors are described above. However, one with ordinary skill in the art should understand that the present invention could also be extended to an application of multi-phase coupled inductor, which is more than two-phase. FIG. 6 shows a schematic block diagram of the blanking time calculation circuit 110 for a voltage converter using an M-phase coupled inductor in accordance with an embodiment of the present invention. M is a natural number larger than or equal to three. Compared with FIG. 5A, the difference is that the blanking time calculation circuit 110 shown in FIG. 6 comprises an adder 26, rather than the adder 21. The adder 26 receives a plurality of delay signals Del1(n), Del2(n), . . . DelM(n), and provides the total delay signal Del_sum by adding the plurality of delay signals Del1(n), Del2(n), . . . DelM(n) together. Referring to FIG. 6, the window signal TnonOC(n) is a duration during which each of the plurality of currents flowing through the windings respectively is less than a corresponding overcurrent threshold, that is all of the over current indicating signals OC1, OC2, . . . OCM are at the low voltage level.

Figure 7:
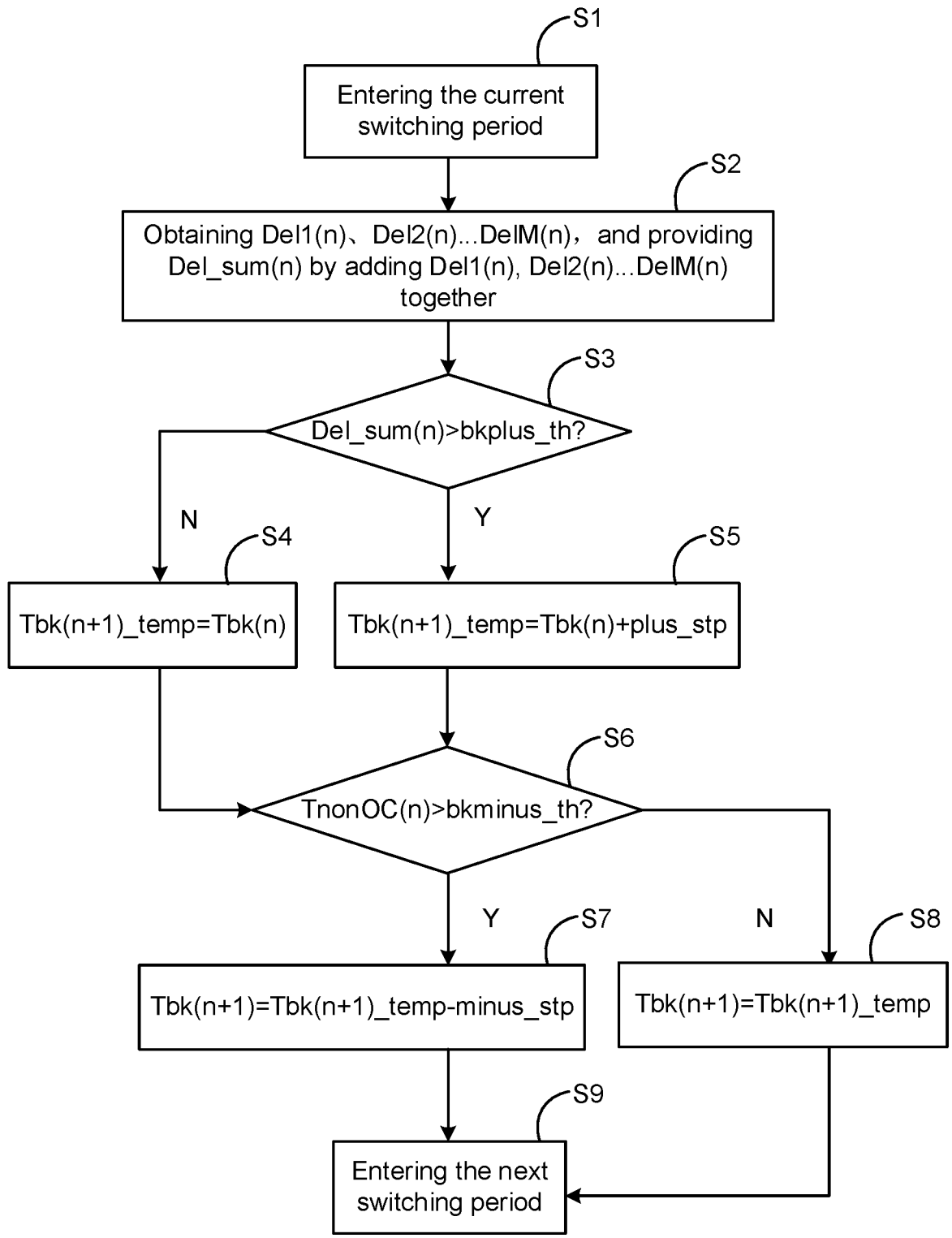
FIG. 7 shows a flowchart of a phase sequence correction method for a voltage converter in accordance with an embodiment of the present invention.

FIG. 7 shows a flowchart of a phase sequence correction method for a voltage converter in accordance with an embodiment of the present invention. The voltage converter has a plurality of switching circuits, and each of the plurality of switching circuits has a phase current flowing through. The voltage converter further comprises a magnetic element having a plurality of windings magnetically coupled with each other, and each of the plurality of windings has a first terminal coupled to an input terminal of the voltage converter through a corresponding one of the plurality of switching circuits, and a second terminal coupled to an output terminal of the voltage converter. As shown in FIG. 7, the phase sequence correction method comprises steps S1-S9.

At the step S1, entering the current switching period. At the step S2, obtaining the delay signals Del1(n), Del2(n), . . . DelM(n), and providing the total delay signal Del_sum(n) by adding the plurality of delay signals Del1(n), Del2(n), . . . DelM(n) together. At the step S3, comparing the total delay signal Del_sum(n) with the incremental threshold bkplus_th, when the the total delay signal Del_sum(n) is larger than the incremental threshold bkplus_th, then to go the step S5, otherwise go to the step S4. At the step S4, the intermediate signal Tbk(n+1)_temp equals the blanking time signal Tbk(n). At the step S5, the intermediate signal Tbk(n+1)_temp equals the sum of the blanking time signal Tbk(n) and the incremental step plus_stp. At the step S6, comparing the window signal TnonOC(n) with the decrement threshold bkminus_th. When the window signal TnonOC(n) is larger than the decrement threshold bkminus_th, then go to the step S7, otherwise go to the step S8. At the step S7, the blanking time signal Tbk(n+1) equals the intermediate signal Tbk(n+1)_temp minus the decrement step minus_stp. At the step S8, the blanking time signal Tbk(n+1) equals the intermediate signal Tbk(n+1)_temp. At the step S9, entering the next switching period.

In one embodiment, an on-time period of each of the plurality of switching circuits is constant.

Obviously many modifications and variations of the present invention are possible in light of the above teachings. It is therefore to be understood that within the scope of the appended claims the invention may be practiced otherwise than as specifically described. It should be understood, of course, the foregoing disclosure relates only to a preferred embodiment (or embodiments) of the invention and that numerous modifications may be made therein without departing from the spirit and the scope of the invention as set forth in the appended claims. Various modifications are contemplated and they obviously will be resorted to by those skilled in the art without departing from the spirit and the scope of the invention as hereinafter defined by the appended claims as only a preferred embodiment(s) thereof has been disclosed.

What is claimed is:

1. A phase sequence correction method for a voltage converter, wherein the voltage converter has a plurality of switching circuits, and each of the plurality of switching circuits has a phase current flowing through, the phase sequence correction method comprising:
    obtaining a plurality of delay signals, each of the plurality of delay signals representing a delay time period from expiring of a blanking time period of a corresponding switching circuit to turning on of a immediately following switching circuit of the corresponding switching circuit;
    providing a total delay signal by adding the plurality of delay signals together;
    comparing the total delay signal with an incremental threshold, if the total delay signal is larger than the incremental threshold, then increasing the blanking time period by an incremental step; and
    providing a plurality of control signals to control the plurality of switching circuits respectively based on the blanking time period.

2. The phase sequence correction method of claim 1, further comprising:
    maintaining the immediately following switching circuit off during the blanking time period.

3. The phase sequence correction method of claim 1, further comprising:
obtaining a window signal representative of a time period during which each of the phase currents is less than a corresponding overcurrent threshold; and
comparing the window signal with a decrement threshold, if the window signal is larger than the decrement threshold, then decreasing the blanking time period by a decrement step.

4. The phase sequence correction method of claim 1, further comprising:
keeping the blanking time period unchanged if the window signal is less than the decrement threshold and if the total delay signal is less than the incremental threshold.

5. The phase sequence correction method of claim 1, wherein an on-time period of each of the plurality of switching circuits is constant.

6. The phase sequence correction method of claim 1, wherein when the blanking time period of the corresponding switching circuit is expired and when the phase current flowing through the immediately following switching circuit is less than an overcurrent threshold, then turning on the immediately following switching circuit.

7. A phase sequence correction circuit for a voltage converter, wherein the voltage converter has a plurality of switching circuits, and each of the plurality of switching circuits has a phase current flowing through, the phase sequence correction circuit comprising:
a blanking time calculation circuit, configured to receive a blanking time signal representative of a blanking time period during which a immediately following switching circuit is not allowed on, and a plurality of delay signals, and the blanking time calculation circuit is configured to update the blanking time signal based on the plurality of delay signals; and
a control signal generation circuit, configured to receive the blanking time signal and provide a plurality of control signals to control the plurality of switching circuits respectively; wherein
if a sum of the plurality of delay signals is larger than an incremental threshold, then the blanking time calculation circuit is configured to increase the blanking time signal by an incremental step.

8. The phase sequence correction circuit of claim 7, wherein each of the plurality of delay signals represents a delay time period from expiring of the blanking time period of a corresponding switching circuit to turning on of the immediately following switching circuit of the corresponding switching circuit.

9. The phase sequence correction circuit of claim 7, further comprising:
an adder, configured to receive the plurality of delay signals, and provide a total delay signal by adding the plurality of delay signals together;
a comparator, configured to receive the total delay signal, and provide a comparison signal via comparing the total delay signal with the incremental threshold; and
a selection circuit, configured to receive the blanking time signal, the comparison signal, and the incremental step, and configured to update the blanking time signal based on the comparison signal and the incremental step.

10. The phase sequence correction circuit of claim 7, wherein
if a window signal is larger than a decrement threshold, then the blanking time calculation circuit is configured to decrease the blanking time signal by a decrement step; and wherein
the window signal represents a time period during which each of the phase currents is less than a corresponding overcurrent threshold.

11. The phase sequence correction circuit of claim 10, further comprising:
a comparator, configured to receive the window signal, and provide a comparison signal via comparing the window signal with the decrement threshold; and
a selection circuit, configured to receive the blanking time signal, the comparison signal, and the decrement step, and configured to update the blanking time signal based on the comparison signal and the decrement step.

12. The phase sequence correction circuit of claim 7, further comprising:
a first comparator, configured to provide a first comparison signal via comparing a sum of the plurality of delay signals with the incremental threshold;
a second comparator, configured to provide a second comparison signal via comparing a window signal with a decrement threshold,
wherein the window signal represents a time period during which each of the phase current is less than a corresponding overcurrent threshold; and
a selection circuit, configured to update the blanking time signal based on the first comparison signal and the second comparison signal.

13. The phase sequence correction circuit of claim 7, wherein when the blanking time period is expired and when the phase current flowing through the immediately following switching circuit is less than an overcurrent threshold, then the control signal generation circuit is configured to turn on the immediately following switching circuit.

14. The phase sequence correction circuit of claim 7, wherein the control signal generation circuit further comprises:
a constant on-time control circuit, configured to control an on-time period of each of the plurality of switching circuits constant.

15. A voltage converter, having an input terminal and an output terminal, comprising:
a plurality of switching circuits, each of the plurality of switching circuits has a phase current flowing through;
a magnetic element, having a plurality of windings magnetically coupled with each other, each of the plurality of windings has a first terminal coupled to the input terminal through a corresponding one of the plurality of switching circuits, and a second terminal coupled to the output terminal;
a blanking time calculation circuit, configured to receive a blanking time signal representative of a blanking time period during which a immediately following switching circuit is not allowed on, and a plurality of delay signals, and the blanking time calculation circuit is configured to update the blanking time signal based on the plurality of delay signals; and
a control signal generation circuit, configured to receive the blanking time signal and provide a plurality of control signals to control the plurality of switching circuits respectively; wherein
if a sum of the plurality of delay signals is larger than an incremental threshold, then the blanking time calculation circuit is configured to increase the blanking time signal by an incremental step.

16. The voltage converter of claim 15, wherein
when a window signal is larger than a decrement threshold, then the blanking time calculation circuit is configured to decrease the blanking time signal by a decrement step; and wherein
the window signal represents a time period during which each of the phase currents is less than a corresponding overcurrent threshold.

17. The voltage converter of claim 16, further comprising:
a comparator, configured to receive the window signal, and provide a comparison signal via comparing the window signal with the decrement threshold; and
a selection circuit, configured to receive the blanking time signal, the comparison signal, and the decrement step, and configured to update the blanking time signal based on the comparison signal and the decrement step.

18. The voltage converter of claim 15, wherein when the blanking time period is expired and when the phase current flowing through the immediately following switching circuit is less than an overcurrent threshold, then the control signal generation circuit is configured to turn on the immediately following switching circuit.

19. The voltage converter of claim 15, further comprising:
an adder, configured to receive the plurality of delay signals, and provide a total delay signal by adding the plurality of delay signals together;
a comparator, configured to receive the total delay signal, and provide a comparison signal via comparing the total delay signal with the incremental threshold; and
a selection circuit, configured to receive the blanking time signal, the comparison signal, and the incremental step, and configured to update the blanking time signal based on the comparison signal and the incremental step.

20. The voltage converter of claim 15, wherein each of the plurality of delay signals represents a delay time period from expiring of the blanking time period of a corresponding switching circuit to turning on of the immediately following switching circuit of the corresponding switching circuit.

\* \* \* \* \*